UNITED STATES PATENT OFFICE.

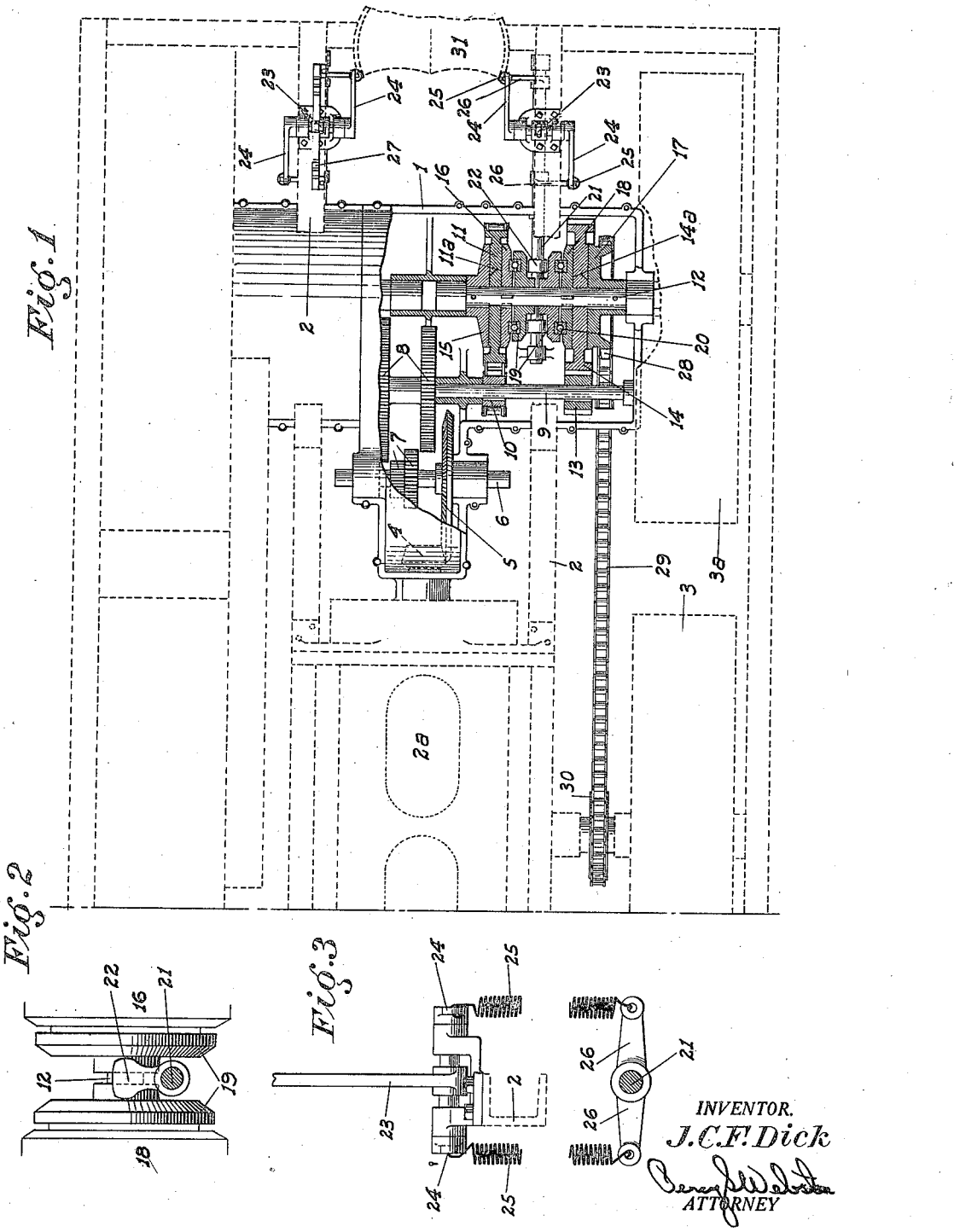

JOSEPH C. F. DICK, OF STOCKTON, CALIFORNIA.

DRIVING MECHANISM FOR TRACTORS.

1,423,758.  Specification of Letters Patent.  Patented July 25, 1922.

Application filed July 12, 1920. Serial No. 395,442.

*To all whom it may concern:*

Be it known that I, JOSEPH C. F. DICK, a citizen of the United States, residing at Stockton, county of San Joaquin, State of California, have invented certain new and useful Improvements in Driving Mechanism for Tractors; and I do declare the following to be a full, clear, and exact description of the same, reference being had to the accompanying drawings, to the characters of reference marked thereon, which form a part of this application.

This invention relates to improvements in tractor construction, and is intended to apply particularly to that type of tractor in which all wheels on each side of the tractor are held against swivel movement and steering is accomplished by releasing the wheels on one side from driving connection while permitting those on the other side to continue rotating under power.

The principal object of my invention therefore is to provide a driving mechanism for such a tractor, which will consist of a minimum of parts and which are so arranged that a single pair of levers is all that is necessary to manipulate the tractor in any way conceivable; that is, run forward, backward, move to one side or the other in either direction, or stand stationary with the power plant of the tractor (preferably a gas engine) still turning over.

Another object is to devise a form of friction clutch to be used in connection with this driving mechanism, and operating means therefor so arranged that wear of the clutch surfaces will be automatically taken up whenever the clutch is manipulated, so that there will be no more danger of slippage at one time than at another.

A further object of the invention is to produce a simple and inexpensive device and yet one which will be exceedingly effective for the purposes which it is designed. These objects I accomplish by means of such structure and relative arrangement of parts as will fully appear by a perusal of the following specification and claims.

In the drawings similar characters of reference indicate corresponding parts in the several views.

Fig. 1 is a top plan view of my improved driving mechanism, the housing therefore being mostly removed to show the arrangement and construction, and showing an outline of a form of tractor in connection therewith.

Fig. 2 is an enlarged fragmentary view of a pair of clutch discs, showing the actuating cam for engaging either one at a time.

Fig. 3 is an enlarged fragmentary end view of the clutch actuating lever and its connections with the cam shaft.

Referring now more particularly to the characters of reference on the drawings, the numeral 1 denotes a supporting housing for the driving mechanism, mounted on the tractor frames 2, the tractor having an engine $2^a$ and front and rear wheels 3 and $3^a$, there being preferably a pair of such wheels on a side and both pairs being held against swivel movement.

The primary drive from the engine is taken through a bevel pinion 4 thereon meshing with a bevel gear 5 fixed on a transverse shaft 6 journaled in the housing 1, which shaft has a pair of different sized pinions 7 fixed together and slidably splined thereon, being moved by any suitable exterior means. These pinions are adapted to alternately mesh with corresponding gears 8 fixed on a jackshaft 9 journaled in the housing. By this means the shaft 9 may be given two speeds with the same speed of the engine, or may be cut out from connection therewith entirely, this construction forming however no part of my invention.

My improved driving mechanism consists of a pair of independently actuated units, driven in common from the counter shaft, there being one such unit for each one of the wheels $3^a$.

Since both such units are identical in every respect, I will only describe one of the same for the sake of simplicity.

Fixed on the shaft 9 on each side of the gears 8 is a sprocket pinion 10, and in alinement therewith and driven thereby a sprocket wheel 11 is loosely mounted on the axle 12 of one of the wheels $3^a$, each wheel having its own separate axle, which is keyed thereto, both axles being in common alinement and journaled in the housing, terminating adjacent each other. Likewise fixed on the shaft 9 and spaced a suitable distance from the pinion 10 is a pinion 13 meshing with a gear 14 loosely mounted on the axle 12. It will thus be evident that the sprocket wheel 11 will turn in the same directions as the shaft 9, while the gear 14 will turn in the reverse direction, so that if either the sprocket or gear are clamped to the axle, the latter will turn in the corresponding direction.

Fixed to the axle 12 and adapted to bear against the face 11ª of the sprocket wheel 11 opposite to the gear 12 is a faced disc 15, while similarly adapted to bear against the other face of said sprocket wheel is another faced disc 16, slidably splined on the axle.

Similarly the gear 14 is provided with opposed faces 14ª, and has on the axle adjacent thereto faced discs 17 and 18, the former being fixed to the shaft on the side of the gear opposite to the sprocket wheel 11 and the disc 18 slidably splined on the shaft on the opposite side of the gear.

Collars 19 are freely mounted on the axle 12 between the adjacent discs 16 and 18, between each collar and the corresponding disc there being thrust bearings 20, of the ball or any other suitable type.

Under the axle 12 at right angles thereto and positioned centrally between the collars 19 is a shaft 21 journaled in the housing 1 and having a pair of double faced cams 22 projecting upwardly therefrom and adapted to bear against either one at a time of the collars in a plane with the center of the axle, or to ride freely therebetween.

This shaft is turned in either direction by means of a lever 23 mounted for fore-and-aft movement on the tractor frame, said lever having at its pivotal point a pair of arms 24 extending in opposite directions, each arm having a stiff tension spring 25 connected thereto and also to the outer end of a corresponding arm 26 projecting from the shaft 21, each pair of arms 24 and 26 being so positioned that their outer ends lie normally in the same vertical plane. Of course it is to be understood that the arms 26 on the shaft 21 project in opposite directions, so that when the lever 23 is pulled in one direction, one of said arms will be raised, turning the shaft 21 in one direction, while with a movement of the lever in the opposite direction, the other arm 26 will be raised, turning the shaft 21 in the other direction.

Thus with a movement of said lever one way or the other, the corresponding slidable disc is pressed against the gear or sprocket wheel, which at the same time is moved along the axle to bear against the corresponding fixed disc, so that the said gear or sprocket wheel will be firmly gripped between the discs, and the latter being keyed on the axle, the direction of rotation depends on whether the gear or sprocket wheel is thus gripped.

By using springs instead of links between the lever-arms and those on the shaft 21, not only is the pressure of the cams against the collars maintained constant, but I avoid all trouble which would be had with the use of rigid links owing to the change of the plane of the outer ends of the arms 24 and 26 as they are moved.

I also preferably provide a notched quadrant 27 for the lever 23, so that the latter may be set and held in any desired position.

In order to connect the wheels on a side to drive in unison, the discs 17 have sprocket teeth 28 formed thereon, over which endless chains 29 pass to sprocket wheels 30 on the other wheels 3. As hereinbefore stated, there are two sets of the driving units described. Both are independent in operation, each being mounted on its individual axle 12, but both being driven from the common countershaft. It is therefore necessary of course to provide a pair of the levers 23, being preferably mounted on each side of the driver's seat 31.

The direction of rotation of the shaft 9 of course depends on the rotation of the engine shaft, but I would preferably arrange the parts of the structure so that the forward drive to the wheels is taken through the pinions and gears 13 and 14, while the reversing is taken care of by the sprocket pinions and wheels 10 and 11.

If desired, the clutches may be mounted on the jackshaft instead of on the axle, without altering in any way, the principle of operation of the mechanism.

From the foregoing description it will be readily seen that I have produced such a device as substantially fulfills the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention, what I claim as new and useful and desire to secure by Letters Patent is:

1. A driving mechanism for tractors comprising a drive shaft, drive wheels, an independent axle for each such wheel keyed thereto and parallel to the shaft, a faced member on the axle turned by the shaft in the opposite direction thereto, another faced member on the axle turned by said shaft in the same direction, thereas, both said members being turnable on the axle, friction discs on the axle on each of the faced members and adapted to bear thereagainst and held against turning on the axle, and means for causing either at a time of the faced members to be gripped between the corresponding discs.

2. A driving mechanism for tractors comprising a driven shaft, drive wheels, an independent axle for each such wheel keyed thereto and parallel to the shaft, a faced member on the axle turned by the shaft in the opposite direction thereto, another faced member on the axle turned by said shaft in the same direction, thereas, both said members being turnable on the axle, friction discs on the axle on each side of the faced members and adapted to bear thereagainst and held against turning on the axle, and a double faced cam projecting between adjacent discs of the oppositely rotating members and adapted to be moved to bear against either one at a time of said discs, and to be held neutral when not engaged.

3. A driving mechanism for tractors comprising a driven shaft, drive wheels, an independent axle for each such wheel keyed thereto and parallel to the shaft, a faced member on the axle turned by the shaft in the opposite direction thereto, another faced member on the axle turned by said shaft in the same direction thereas, both said members being turnable on the axle on each side of the faced members, the opposite one of such disks being held against movement on the axle but the adjacent ones being slidably splined thereon, a double faced cam projecting between the slidable discs, and hand actuated means for turning the cam in either direction whereby it will bear against the corresponding disc to slide the frame into contact with the adjacent faced member, and to then move the latter into contact with the fixed disc on the opposite side thereof.

4. A driving mechanism for tractors comprising a driven shaft, drive wheels, an independent axle for each such wheel keyed thereto and parallel to the shaft, a faced member on the axle turned by the shaft in the opposite direction thereto, another faced member on the axle turned by said shaft in the same direction thereas, both said members being turnable on the axle, friction discs on the axle on each side of the faced members and adapted to bear thereagainst and held against turning on the axle, a shaft projecting at right angles to the axle between adjacent discs of the faced members, a double-faced cam projecting from the shaft, a hand actuated lever, and connecting means between such lever and shaft whereby the latter may be turned and the cam held against either of the said discs with a constant pressure.

5. A driving mechanism for tractors comprising a driven shaft, drive wheels, an independent axle for each such wheel keyed thereto and parallel to the shaft, a faced member on the axle turned by the shaft in the opposite direction thereto, another faced member on the axle turned by said shaft in the same direction thereas, both said members being turnable on the axle, friction discs on the axle on each side of the faced members and adapted to bear thereagainst and held against turning on the axle, a shaft projecting at right angles to the axle between adjacent discs of the faced members, a double-faced cam projecting from the shaft, a hand actuated lever, and coiled springs operatively connected to said lever and to the shaft to cause the latter to be turned with a corresponding movement of the lever.

6. In combination with a shaft arranged to be turned and having means thereon for engaging either at a time of a pair of friction clutches, opposed arms on said shaft, a lever pivoted transversely of the shaft and substantially in a vertical plane with the shaft, arms projecting from the lever substantially parallel with the shaft and terminating at a point substantially in a vertical plane with the ends of the shaft-arms, and coiled springs connecting the lever arms with the corresponding shaft-arms.

In testimony whereof I affix my signature.

JOSEPH C. F. DICK.